(12) United States Patent
Broadley

(10) Patent No.: US 7,260,877 B2
(45) Date of Patent: Aug. 28, 2007

(54) BORING AND TURNING MILL

(75) Inventor: John Stewart Broadley, Huddersfield (GB)

(73) Assignee: Dorries Scharmann Technologie GmbH (DE)

( * ) Notice: Subject to any disclaimer, the term of this patent is extended or adjusted under 35 U.S.C. 154(b) by 543 days.

(21) Appl. No.: 10/492,994

(22) PCT Filed: Oct. 14, 2002

(86) PCT No.: PCT/EP02/11460

§ 371 (c)(1),
(2), (4) Date: Jul. 16, 2004

(87) PCT Pub. No.: WO03/035309

PCT Pub. Date: May 1, 2003

(65) Prior Publication Data

US 2004/0240953 A1 Dec. 2, 2004

(30) Foreign Application Priority Data

Oct. 18, 2001 (DE) .................................. 101 51 528

(51) Int. Cl.
B03B 3/26 (2006.01)
B23B 29/034 (2006.01)

(52) U.S. Cl. ...................... 29/27 R; 408/153; 408/152; 408/161; 82/1.2

(58) Field of Classification Search ................ 408/153, 408/157, 158, 152, 161; 82/1.2, 1.5, 131; 29/27 C, 27 R; 407/77, 78, 92; 409/231; B23B 29/034, B23B 3/26

See application file for complete search history.

(56) References Cited

U.S. PATENT DOCUMENTS

| 1,312,737 | A |   | 8/1919 | Krueger |
| 2,404,433 | A | * | 7/1946 | Christman ..................... 82/1.4 |
| 3,113,475 | A | * | 12/1963 | Lombardo ..................... 82/1.4 |
| 4,400,118 | A | * | 8/1983 | Yamakage et al. ............. 408/3 |
| 4,432,258 | A | * | 2/1984 | Currer ......................... 82/1.2 |
| 4,447,177 | A | * | 5/1984 | Ochiai et al. ............... 408/161 |
| 4,451,185 | A | * | 5/1984 | Yamakage ..................... 408/2 |
| 4,480,366 | A | * | 11/1984 | Takahashi et al. .......... 29/26 A |
| 4,596,502 | A | * | 6/1986 | Cattani ........................ 409/231 |
| RE32,211 | E | * | 7/1986 | Jerue et al. ................... 82/1.2 |
| 4,607,549 | A | * | 8/1986 | Krempel ...................... 82/131 |
| 4,676,704 | A | * | 6/1987 | Donnini et al. ............. 409/208 |
| 4,741,230 | A |   | 5/1988 | Bohner |

(Continued)

FOREIGN PATENT DOCUMENTS

DE    880 087    6/1953

(Continued)

Primary Examiner—Daniel W. Howell
(74) Attorney, Agent, or Firm—Ostrolenk, Faber, Gerb & Soffen, LLP

(57) ABSTRACT

A boring and turning mill, comprising a nonrotatable tool ram, a rotationally drivable tool spindle in the tool ram, an auxiliary head which can be attached to the tool ram in a nonrotatable manner, two work slides arranged in opposition to each other and displaceable and movable in a radially adjustable manner in the auxiliary head, each slide having a respective tool receptacle, and a drive connection to the slides for effecting a radial infeed movement of the work slides, between the tool spindle and the work slides. The drive connection is a threaded spindle which engages threads on the work slides, so that axial movement of the threaded spindle causes radial movement of the work slides.

7 Claims, 3 Drawing Sheets

U.S. PATENT DOCUMENTS

| | | |
|---|---|---|
| 5,651,645 A | 7/1997 | Wawrzyniak |
| 5,836,727 A | 11/1998 | Scheer |
| 5,967,007 A | 10/1999 | Scheer |
| 6,655,883 B2 | 12/2003 | Maar |

FOREIGN PATENT DOCUMENTS

| | | | |
|---|---|---|---|
| DE | 10 99 308 | | 2/1961 |
| DE | 2749200 A1 | * | 5/1979 |
| DE | 3245195 | | 7/1984 |
| DE | 3511790 | | 10/1986 |
| DE | 38 01 507 | | 8/1989 |
| JP | 54085492 A | * | 7/1979 |
| JP | 55131413 A | * | 10/1980 |
| JP | 61056804 A | * | 3/1986 |
| JP | 02274406 A | * | 11/1990 |
| JP | 04261701 A | * | 9/1992 |
| JP | 07051910 A | * | 2/1995 |

\* cited by examiner

BORING AND TURNING MILL

BACKGROUND OF THE INVENTION

The invention relates to a vertical boring and turning mill, comprising a tool ram, a rotationally drivable tool spindle arranged in the tool ram, and an auxiliary head which can be attached to the tool ram.

Known auxiliary heads of this type serve on vertical boring and turning mills to increase the rate of utilization. For example, plane surfaces are machined by means of a rotationally driven milling head, or they are used to produce bores, in particular threaded holes, in the workpiece arranged on the table, while the table is stationary. For these rotationally driven tools, a tool spindle which can be coupled to the tool in the auxiliary head is arranged in the tool ram.

For turning a workpiece rotating on the table, a corresponding turning tool is attached to the turning-tool ram. The feed of the turning tool in the horizontal and vertical directions is effected by corresponding movement of the tool ram. In this case, the workpiece is machined by a turning tool, as a result of which the machining time is determined. Also, deflecting forces arise in the direction of the axis of rotation during the machining of bores in the workpiece. These deflecting forces influence the machining accuracy, since the deformation of the tool ram that is caused by the deflecting forces becomes greater as the tool ram is moved further out of its slide. Although attempts are made to take these factors into account by appropriate dimensioning of the tool ram and its bearing arrangement, only a compromise is possible for this without a detrimental increase in the dimensions and the weight of a vertical boring and turning mill with predetermined dimensions of the table.

SUMMARY OF THE INVENTION

The problem underlying the invention is therefore to provide an auxiliary head on a vertical boring and turning mill having a tool spindle in the tool ram, wherein the auxiliary head can reduce the machining time for bores while at the same time it can compensate for the displacement forces.

On a machine tool of the type mentioned above, this problem is solved according to the invention by providing two work slides, which are radially adjustable in opposition in the auxiliary head. Each slide has a tool receptacle. The auxiliary head is fixed relative to the tool ram. A drive connection, effecting a radial infeed movement of the work slides, is provided between the tool spindle and the work slides.

The simultaneous machining of a bore, in a workpiece rotating on the table of the vertical boring and turning mill, using two turning tools, can at least theoretically halve the machining time and provide complete compensation for the displacement forces, since the tool cutting edges are arranged offset from one another by 180°.

The adjusting movement of the work slides is effected via the tool spindle, which for this purpose is actuated solely in a rotary manner.

There is no necessity for attachment using an actuating rod guided by the tool ram or for a feed drive to be arranged in the auxiliary head for the radial infeed movement of the work slides. The auxiliary head according to the invention can be used on any turning machine having a tool ram and a rotationally drivable tool spindle arranged therein.

A facing head having two work slides which are jointly displaceable parallel to one another in opposite directions is disclosed in EP 0 717 671 B. However, this facing head is a rotationally driven facing head which can be fastened to the spindle of a machine tool. The displacement of the work slides is effected via an additional adjusting rod arranged in the spindle of the machine tool, so that the facing head described in EP 0 717 671 B1 can be used only on a machine tool specifically designed for it. In addition, the requisite adjusting rod constitutes a considerable additional expenditure on the machine and is also problematic from the design point of view especially at high speeds of the work spindles (balance problems, etc.).

A rotationally driven tool head is also described in DE 196 05 156 A1. Although the tool head requires no actuating device in the machine tool, it is provided with a separate drive for a positioning device.

The drive connection can be of very simple design and may either be comprised of a spindle in the auxiliary head, which can be coupled to the tool spindle, or of a gear on the spindle in the region of the work slides, and tooth systems in engagement with said gear on the work slides, or it may be comprised of a nut which can be coupled to the tool spindle, an axially adjustable threaded spindle interacting with the nut, and of opposed helical tooth systems, interacting with corresponding helical tooth systems on the work slides, on a flatted toothed rack part of the threaded spindle.

In both cases, the rotary movement of the tool spindle, by a simple, kinematic transformation, produces the radial movement of the work slides and thus of the cutting tool. This drive connection can be designed largely free of backlash and with low friction losses while at the same time having a robust construction.

In an embodiment having helical tooth systems on the toothed rack part of the threaded spindle and corresponding helical tooth systems on the work slides, the angles of the helical tooth systems can preferably be selected such that a radial adjusting travel of the work slides of in each case of 0.5 mm, corresponds to an axial adjusting travel of the threaded spindle of 1 mm, so that an axial adjustment of the threaded spindle by 1 mm results in an increase or reduction in diameter of the bore to be machined likewise by 1 mm.

The auxiliary head according to the invention, in the same way as an auxiliary head for a rotationally driven tool, can advantageously be inserted into a tool receptacle on the tool ram for automatic accommodation of a correspondingly adapted retaining part. The coupling between the tool ram and a corresponding element of the drive connection is effected via a standardized machine taper.

Other features and advantages of the present invention will become apparent from the following description of the invention which refers to the accompanying drawings.

BRIEF DESCRIPTION OF THE DRAWINGS

The invention is explained in more detail below with reference to an exemplary embodiment shown in the drawings.

DESCRIPTION OF PREFERRED EMBODIMENTS OF THE INVENTION

Figure 1:
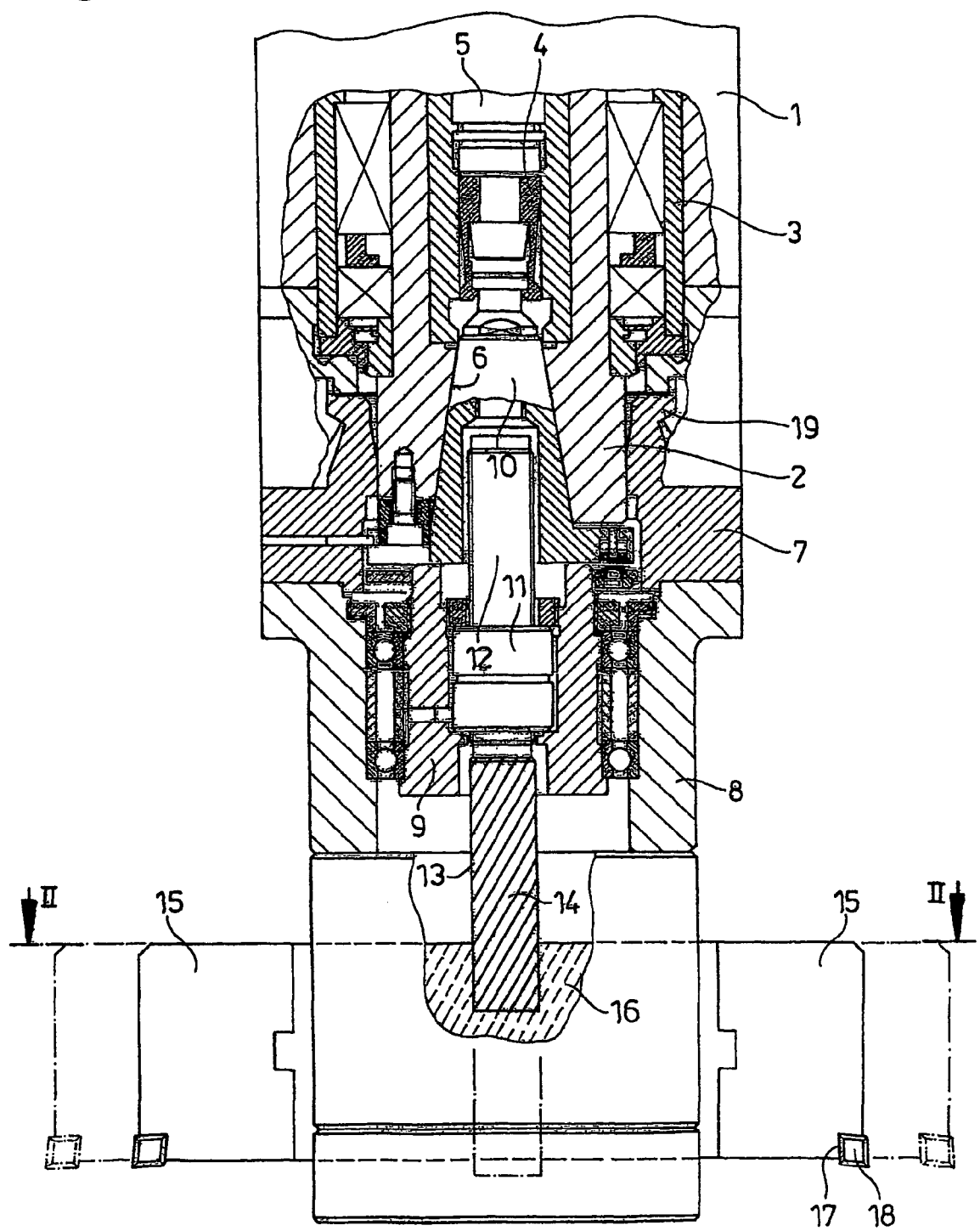
FIG. 1 shows a schematic representation of an auxiliary head on a tool ram, partly in section.

A vertical boring and turning mill, only the end region of a vertically guided tool ram 1 is shown. A rotationally drivable tool spindle 2 is mounted in a sliding sleeve 3 in the tool ram 1.

A collet 4 and a clamping rod 5, which can clamp a standardized machine taper 10 in a tapered receptacle 6 of the tool spindle 2 and release it again, are arranged in a known manner inside the tool spindle.

An auxiliary head 8 is provided with an adapter 7, which allows the auxiliary head 8 to be fastened to the tool ram 1 in the same way as an auxiliary head for a tool which can be driven in a rotational manner by the tool spindle 2. To this end, an extension (not described in detail) of the adapter 7 is held in a nonrotatable manner in a tool receptacle 19 on the tool ram 1.

The auxiliary head 8 is screwed to the adapter 7 and has a rotatably mounted bush 9 which can be coupled to the tool spindle 2. Arranged in this bush 9 is a nut 11 which interacts with a coaxial threaded spindle 12. If the tool spindle 2 is rotated, the nut 11 rotates with it, while the stationary threaded spindle 12 is moved up or down depending on the direction of rotation of the tool spindle 2. A toothed rack part 13 having a helical tooth system 14 and connected to the threaded spindle 12 projects between work slides 15. The slides are guided in parallel in corresponding guides of the auxiliary head 8. The tooth systems 14 on both sides of the part 13 are directed to move in opposition to each other and are in engagement with corresponding tooth systems 16 on the work slides.

A cutting tool, in the present case a cutting tip, is arranged in a tool receptacle 17 of the slides. Radial infeed movement of the work slides 15 is therefore produced from the up and down movement of the threaded spindle 12 and thus of the toothed rack part 13 connected thereto, because the helical tooth system translates the axial movement of the rack 13 into radial direction movement of the slides 15. This up and down movement is effected by the rotation of the tool spindle 2.

The engagement of the helical tooth system 14 on the toothed rack part 13 with the helical tooth systems 16 on the work slides 15 can be designed largely free of backlash, so that precise correlation can be achieved between the axial movement of the threaded spindle 12 with the toothed rack part 13 and the radial movement of the work slides 15. The angle of the helical tooth systems 14 and 16 can be advantageously determined such that a radial movement of each work slide 15 of 0.5 mm corresponds to an axial movement of the threaded spindle 12 with the toothed rack part 13 of 1 mm, so that an axial movement of 1 mm results in a change in diameter of likewise 1 mm. A direct displacement measuring system can advantageously also be arranged in the region of the work slides, wherein this displacement measuring system enables the adjusting movement to be recorded directly and thus allows greater positioning accuracy.

Figure 2:
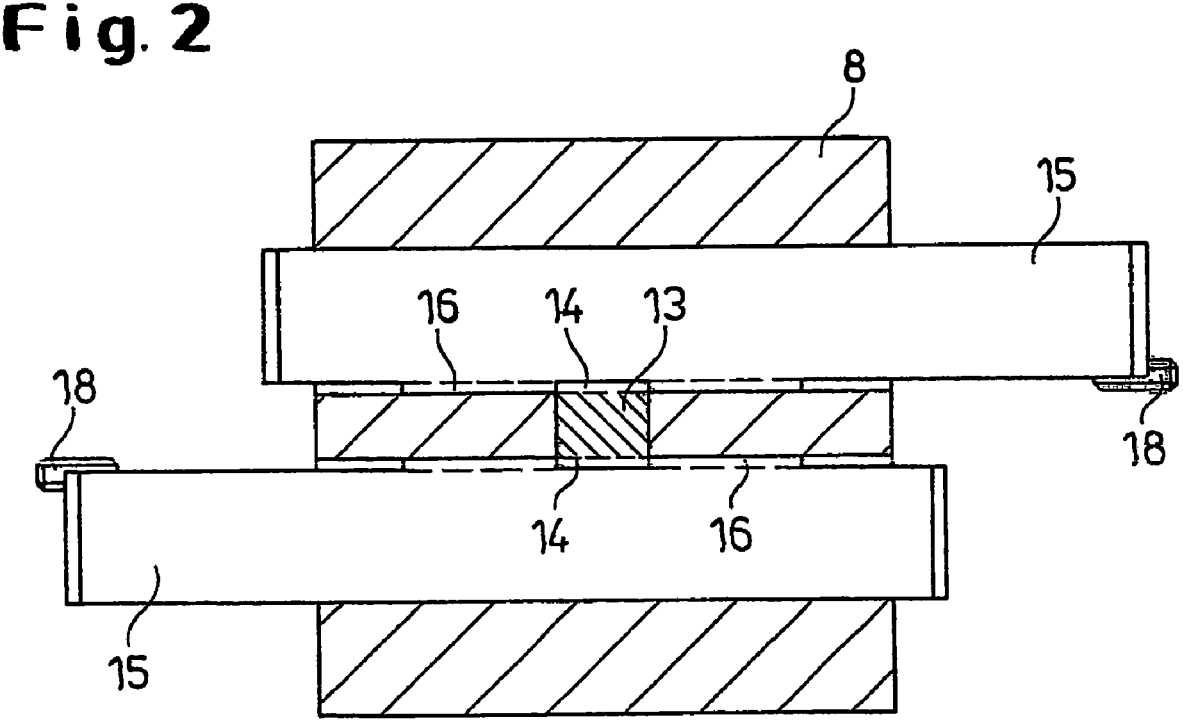
FIG. 2 shows a cross section along line II-II in FIG. 1.

FIG. 2 shows that the toothed rack part 13 is of square design, although it is of course also possible to design this toothed rack part 13 to be considerably wider in order to distribute the adjusting forces over a larger number of teeth.

Figure 3:
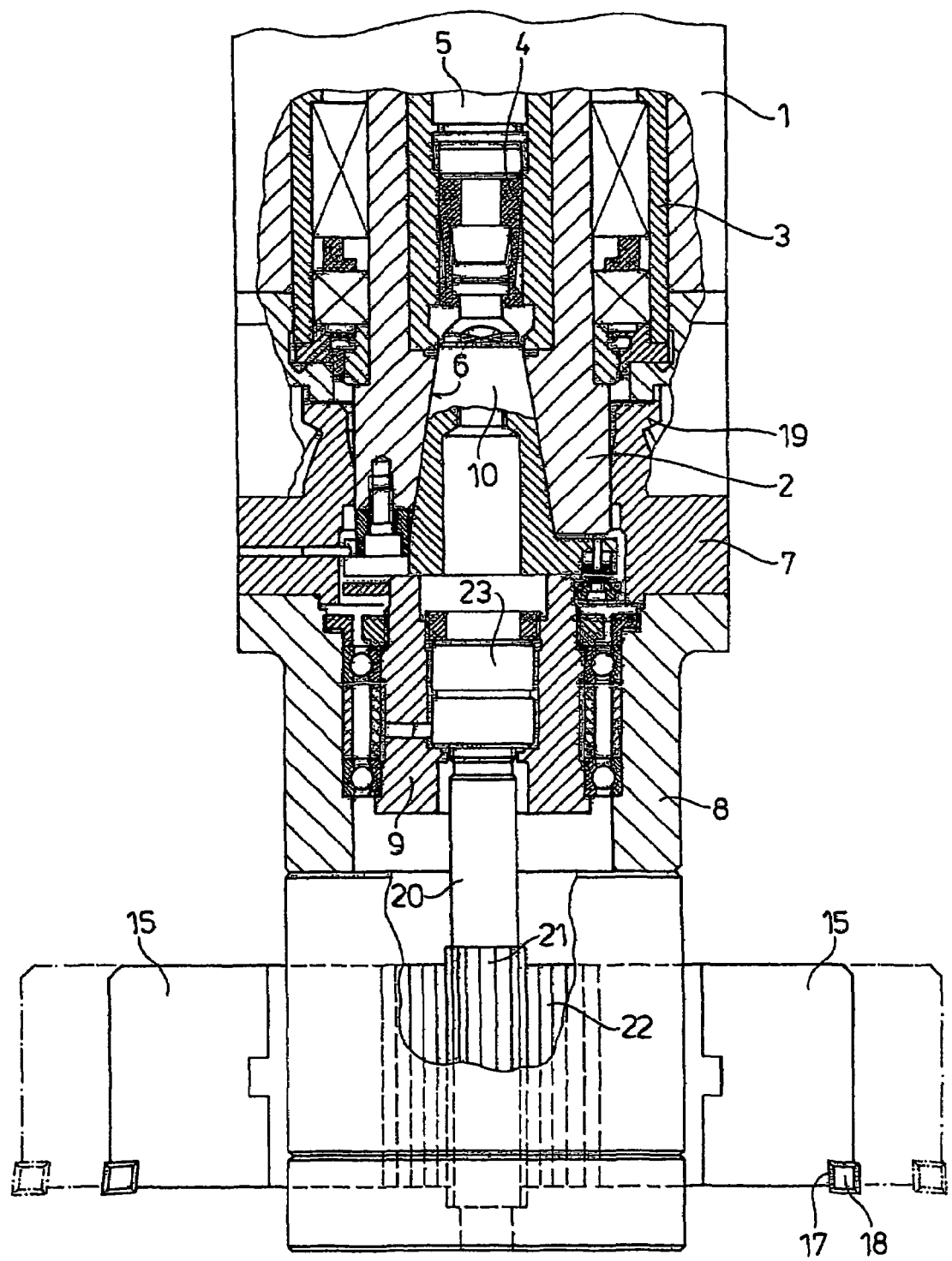
FIG. 3 shows a representation similar to FIG. 1 with a different embodiment of the drive connection between the tool spindle and the work slides.

The embodiment according to FIG. 3 differs from that according to FIGS. 1 and 2 by virtue of the fact that a spindle 20, rotatably coupled via a coupling 23 to the bush 9 and via the machine taper 10 to the tool spindle 2, in the region of the work slides 15 has a gear 21 which interacts with corresponding tooth systems 22 on the work slides 15. In this embodiment, the rotary movement of the work spindle 2 is therefore converted directly into a radial displacement of the work slides 15 via the gear 21 and the tooth system 22 on the work slides 15.

Since the auxiliary head according to the invention is of completely symmetrical construction, the radially directed deflecting forces acting on the cutting tips 18 are completely compensated for, so that no deformation of the tool ram 1 at all occurs during the machining of bores, irrespective of how far the tool ram 1 has been moved out of its slide.

Although the present invention has been described in relation to particular embodiments thereof, many other variations and modifications and other uses will become apparent to those skilled in the art. It is preferred, therefore, that the present invention be limited not by the specific disclosure herein, but only by the appended claims.

What is claimed is:

1. A boring and turning mill, comprising
   a nonrotatable tool ram;
   a rotationally drivable tool spindle in the tool ram;
   a auxiliary head which can be attached to the tool ram in a nonrotatable manner;
   two work slides arranged in opposition to each other and displaceable in the auxiliary head in a radially adjustable manner, and each having a respective tool receptacle, and
   a drive connection to the slides operable thereon for effecting a radial infeed movement of the work slides, between the tool spindle and the work slides.

2. The boring and turning mill as claimed in claim 1, wherein the drive connection comprises a drive spindle, which can be coupled to the tool spindle in the auxiliary head, a gear on the drive spindle and located in the region of the work slides, and tooth systems on the work slides and in engagement with the gear.

3. The boring and turning mill as claimed in claim 1, wherein the drive connection comprises
   a nut which can be coupled to the tool spindle;
   an axially adjustable threaded spindle interacting with the nut such that rotation of the nut with respect to the threaded spindle causes axial movement of the threaded spindle;
   opposed first helical tooth systems on the threaded spindle;
   corresponding second helical tooth systems on the work slides for being acted upon by the first tooth systems for causing the threaded spindle to move axially.

4. The boring and turning mill as claimed in claim 3, wherein the rack includes a flatted toothed rack part of the threaded spindle and the first tooth systems engage the toothed rack part.

5. The boring and turning mill as claimed in claim 3, wherein the angles of the second helical tooth systems on the work slides and the first tooth systems on the toothed rack part are such that a radial adjusting travel of the work slides of 0.5 mm corresponds to an axial movement of the threaded spindle of 1 mm.

6. The boring and turning mill as claimed in claim 1, further comprising a tool receptacle on the tool ram set up for automatically accommodating a correspondingly adapted retaining part of the auxiliary head and a machine taper for coupling between the tool ram and a corresponding element of the drive connection.

7. The boring and turning mill as claimed in claim 1, further comprising a direct displacement measuring system arranged in the region of the work slides.

* * * * *